(12) United States Patent
Takahashi

(10) Patent No.: US 11,762,617 B2
(45) Date of Patent: Sep. 19, 2023

(54) DISPLAY APPARATUS, DISPLAY METHOD, AND DISPLAY SYSTEM

(71) Applicant: Masato Takahashi, Tokyo (JP)

(72) Inventor: Masato Takahashi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/816,802

(22) Filed: Aug. 2, 2022

(65) Prior Publication Data

US 2023/0082281 A1 Mar. 16, 2023

(30) Foreign Application Priority Data

Sep. 13, 2021 (JP) ................................. 2021-148719
Jun. 7, 2022 (JP) ................................. 2022-092374

(51) Int. Cl.
| G06F 3/14 | (2006.01) |
| G06F 3/04883 | (2022.01) |
| G06F 40/30 | (2020.01) |
| G06V 30/22 | (2022.01) |
| G06V 30/32 | (2022.01) |
| G06V 30/19 | (2022.01) |

(52) U.S. Cl.
CPC ............ *G06F 3/14* (2013.01); *G06F 3/04883* (2013.01); *G06F 40/30* (2020.01); *G06V 30/19* (2022.01); *G06V 30/22* (2022.01); *G06V 30/32* (2022.01)

(58) Field of Classification Search
CPC ........ G06F 3/14; G06F 40/30; G06F 3/04883; G06V 30/32; G06V 30/19; G06V 30/22
See application file for complete search history.

(56) References Cited

U.S. PATENT DOCUMENTS

| 8,941,733 | B2 * | 1/2015 | Albers ................ G06F 16/7335 |
| | | | 348/149 |
| 2014/0078244 | A1 | 3/2014 | Kitazawa et al. |
| 2015/0091940 | A1 | 4/2015 | Emori et al. |
| 2017/0034474 | A1 | 2/2017 | Goto et al. |
| 2017/0034480 | A1 | 2/2017 | Goto et al. |
| 2017/0078616 | A1 | 3/2017 | Uchiyama et al. |
| 2017/0127020 | A1 | 5/2017 | Takahashi et al. |
| 2017/0278549 | A1 * | 9/2017 | Tamura ................ G11B 27/036 |
| 2018/0018062 | A1 | 1/2018 | Takahashi |
| 2019/0026272 | A1 | 1/2019 | Kishi et al. |
| 2020/0380403 | A1 * | 12/2020 | Aggarwal ............ G06V 30/274 |
| 2021/0271707 | A1 * | 9/2021 | Lin ........................ G06F 40/289 |

FOREIGN PATENT DOCUMENTS

| JP | 2015-069284 | 4/2015 |
| JP | 2015-191169 | 11/2015 |
| JP | 2019-021272 | 2/2019 |

\* cited by examiner

*Primary Examiner* — Doon Y Chow
(74) *Attorney, Agent, or Firm* — IPUSA, PLLC

(57) ABSTRACT

A display apparatus includes circuitry to receive an input of hand drafted data, display, on a display, an object corresponding to the hand drafted data and an external image that is externally input, perform character recognition on the hand drafted data to convert the hand drafted data into text data, and display, on the display, a search result obtained using at least a part of the external image and at least a part of the text data.

9 Claims, 15 Drawing Sheets

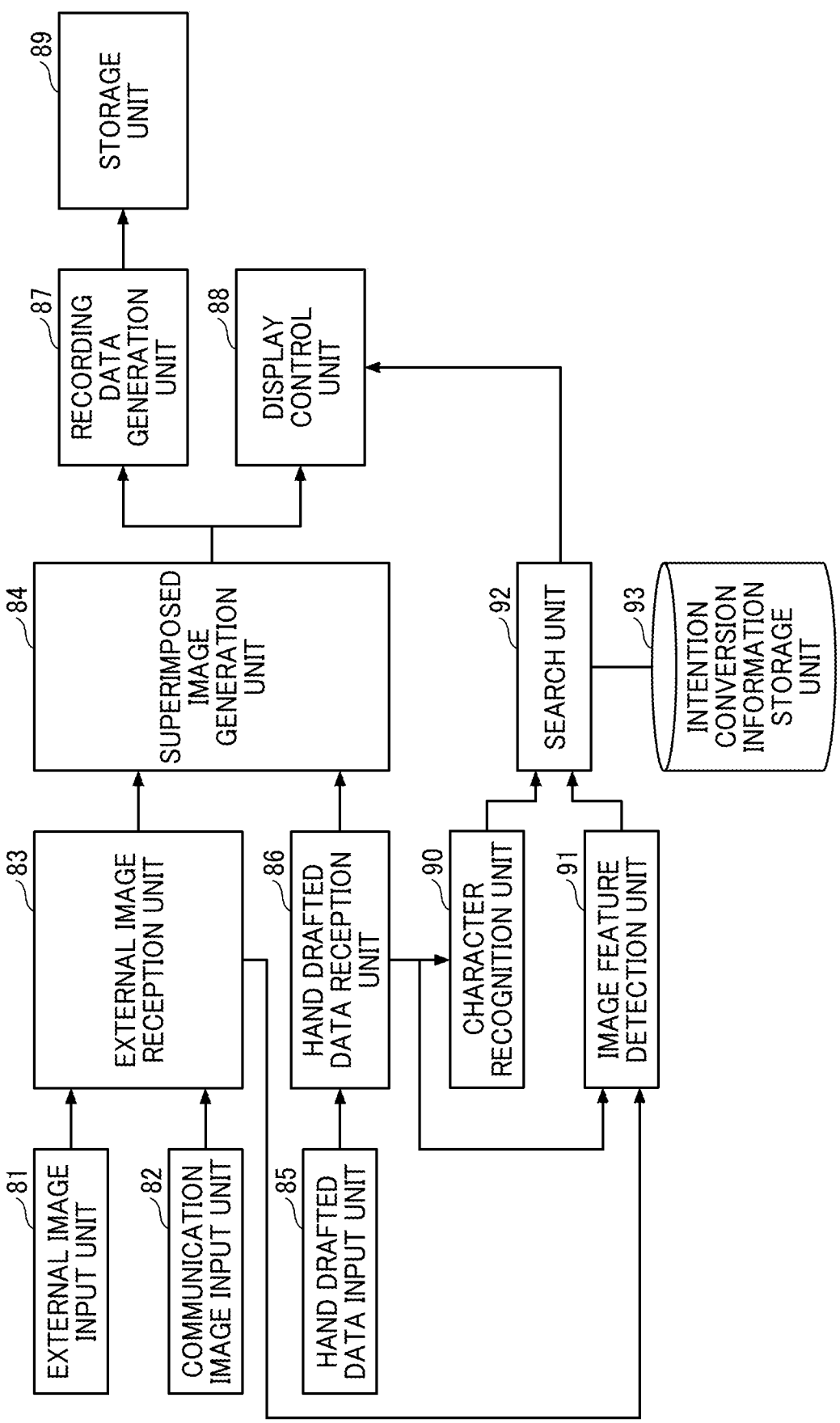

FIG. 8

| TEXT DATA | SEARCH INTENT | INFORMATION USED FOR SEARCH |
|---|---|---|
| SOURCE OF DATA | COPYRIGHT OF WEB SITE HAVING IMAGE WITHIN FRAME | IMAGE WITHIN FRAME |
| PREDICTION ACCURACY | SEARCH FOR SIMILAR IMAGE IN WEB SITE HAVING IMAGE WITHING FRAME | IMAGE WITHIN FRAME |
| CONFIRM | RELIABILITY OF CHARACTER DATA OF IMAGE WITHIN FRAME | FEATURE OF IMAGE (CHARACTER DATA) |
| OBTAIN ORIGINAL | ACQUISITION OF HIGH-QUALITY IMAGE CORRESPONDING TO IMAGE WITHIN FRAME | IMAGE WITHIN FRAME, FEATURE OF IMAGE (COLOR, TEXTURE) |
| DETAILS (CHARACTERS) | ACQUISITION OF DETAILED INFORMATION ON WEB SITE HAVING IMAGE WITHIN FRAME | IMAGE WITHIN FRAME, TEXT DATA (CHARACTERS) |

FIG. 9

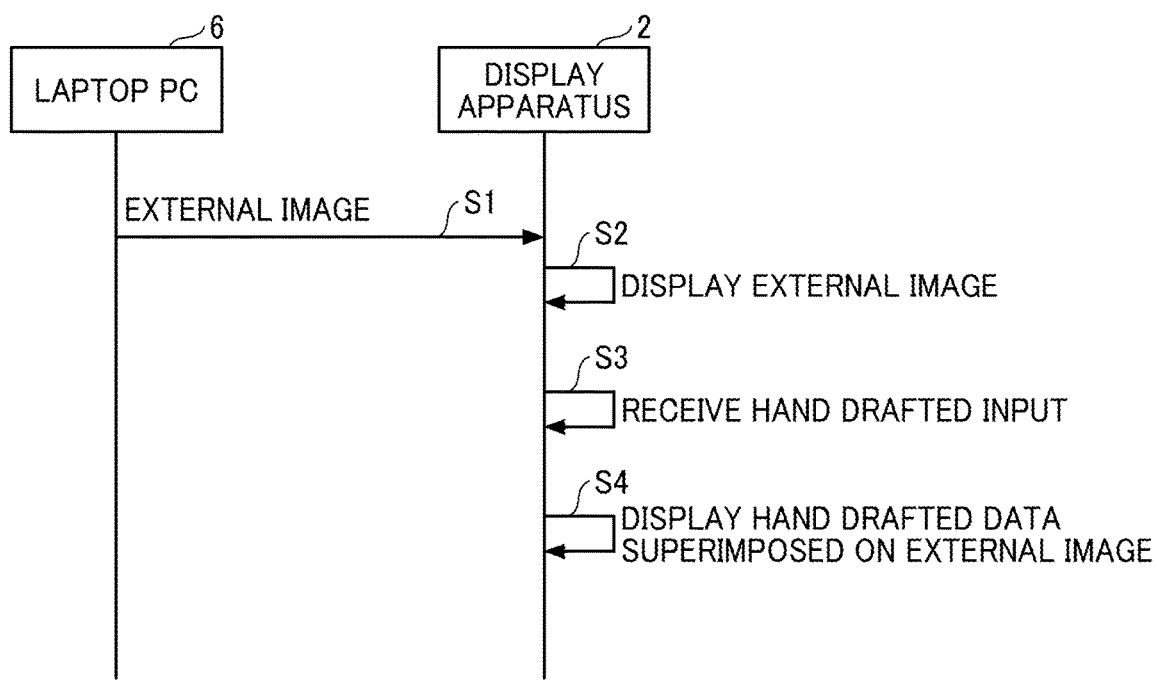

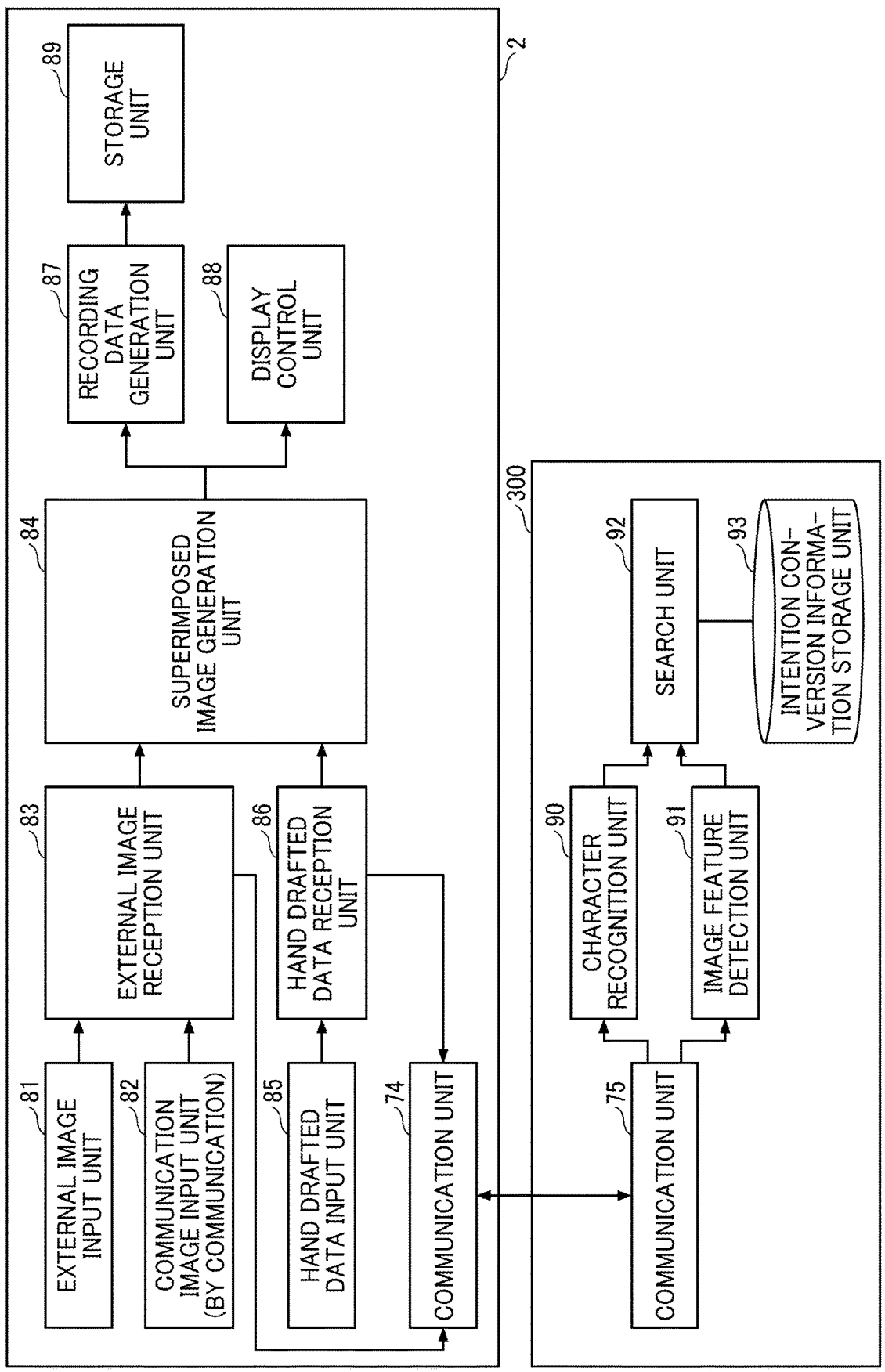

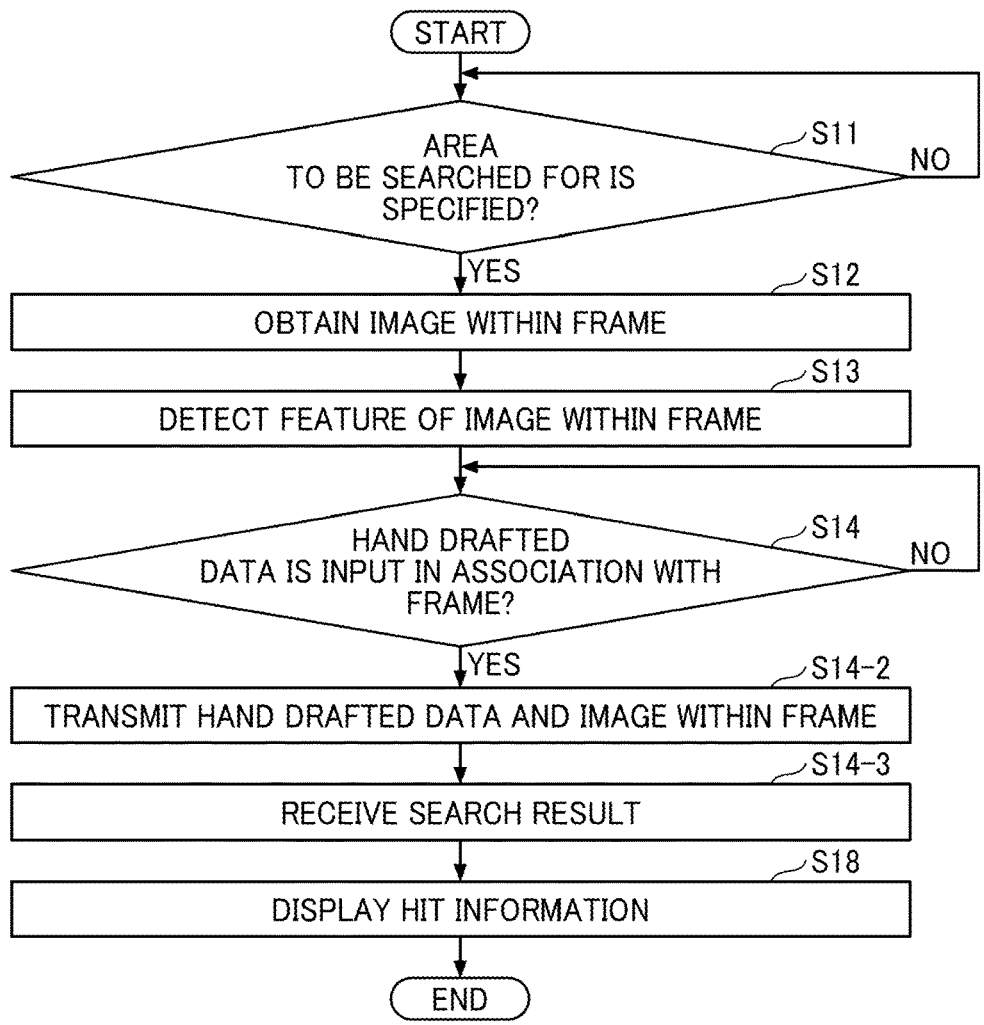
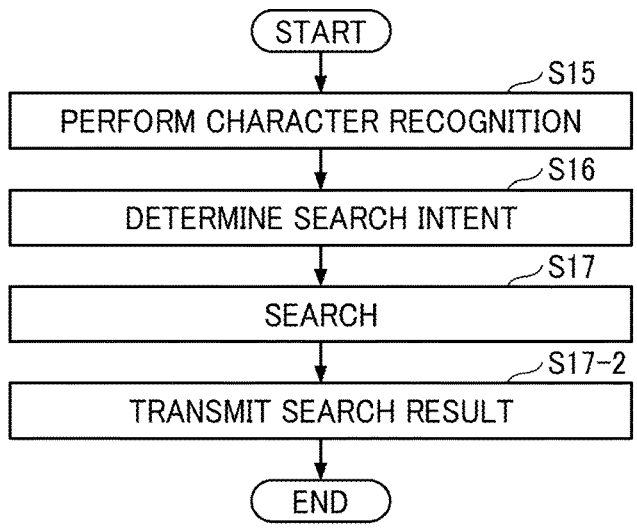

DISPLAY APPARATUS, DISPLAY METHOD, AND DISPLAY SYSTEM

CROSS-REFERENCE TO RELATED APPLICATIONS

This patent application is based on and claims priority pursuant to 35 U.S.C. § 119(a) to Japanese Patent Application Nos. 2021-148719, filed on Sep. 13, 2021, and 2022-092374, filed on Jun. 7, 2022, in the Japan Patent Office, the entire disclosures of which are hereby incorporated by reference.

BACKGROUND

Technical Field

Embodiments of the present disclosure relate to a display apparatus, a display system, and a display method.

Related Art

Display apparatuses such as electronic whiteboards each having a touch panel display that displays hand drafted data input by user hand drafted input, namely written or drawn by a user, with an input device, such as a dedicated electronic pen, or a finger on the touch panel display are known. Unlike a conventional whiteboard, such a display apparatus can store hand drafted data as electronic data, and display an image of a material being displayed by an external device, such as a personal computer (PC), by connecting to the external device.

For example, there is a case where a new material is desired during a meeting using a display apparatus. For such a case, a devised technique of acquiring content based on an image may be applicable.

A known system searches for an object similar to an object in a captured image included in a search request and acquires associated information associated with the searched object (for example, when the captured image includes a uniform resource locator (URL), information on a web site indicated by the URL).

SUMMARY

According to an aspect of the present disclosure includes a display apparatus including circuitry to receive an input of hand drafted data, display, on a display, an object corresponding to the hand drafted data and an external image that is externally input, perform character recognition on the hand drafted data to convert the hand drafted data into text data, and display, on the display, a search result obtained using at least a part of the external image and at least a part of the text data.

According to an aspect of the present disclosure includes a display method including receiving an input of hand drafted input data, displaying, on a display, an image externally input and an object corresponding to the hand drafted input data, performing character recognition on the hand drafted data to convert the hand drafted data into text data, and displaying, on the display, a search result obtained using at least a part of the image and at least a part of the text data According to an aspect of the present disclosure includes a display system including an information processing apparatus including information processing apparatus circuitry, and a display apparatus including display apparatus circuitry. The information processing apparatus circuitry receives hand drafted data and an image from the display apparatus, performs character recognition on the hand drafted data to convert the hand drafted data into text data, and transmits to the display apparatus a search result obtained using at least a part of the image and at least a part of the text data. The display apparatus circuitry receives the hand drafted data via a display, displays, on the display, an object corresponding to the hand drafted data and the image externally input, and displays, on the display, the search result transmitted from the information processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 6 is a block diagram illustrating an example of a functional configuration of the display apparatus according to the exemplary embodiment of the disclosure;

FIG. 8 is a diagram schematically illustrating intention conversion information stored in an intention conversion information storage unit according to the exemplary embodiment of the disclosure;

FIG. 9 is a sequence diagram illustrating overall operation performed by the communication system according to the exemplary embodiment of the disclosure;

FIG. 14 is a block diagram illustrating an example of a functional configuration of a display apparatus and an information processing apparatus in the display system of FIG. 13;

FIG. 15 is a flowchart illustrating overall operation performed by the display apparatus included in the display system of FIG. 13; and FIG. 16 is a flowchart illustrating a process of searching performed by a search unit included in the information processing apparatus included in the display system of FIG. 13.

Figure 1:
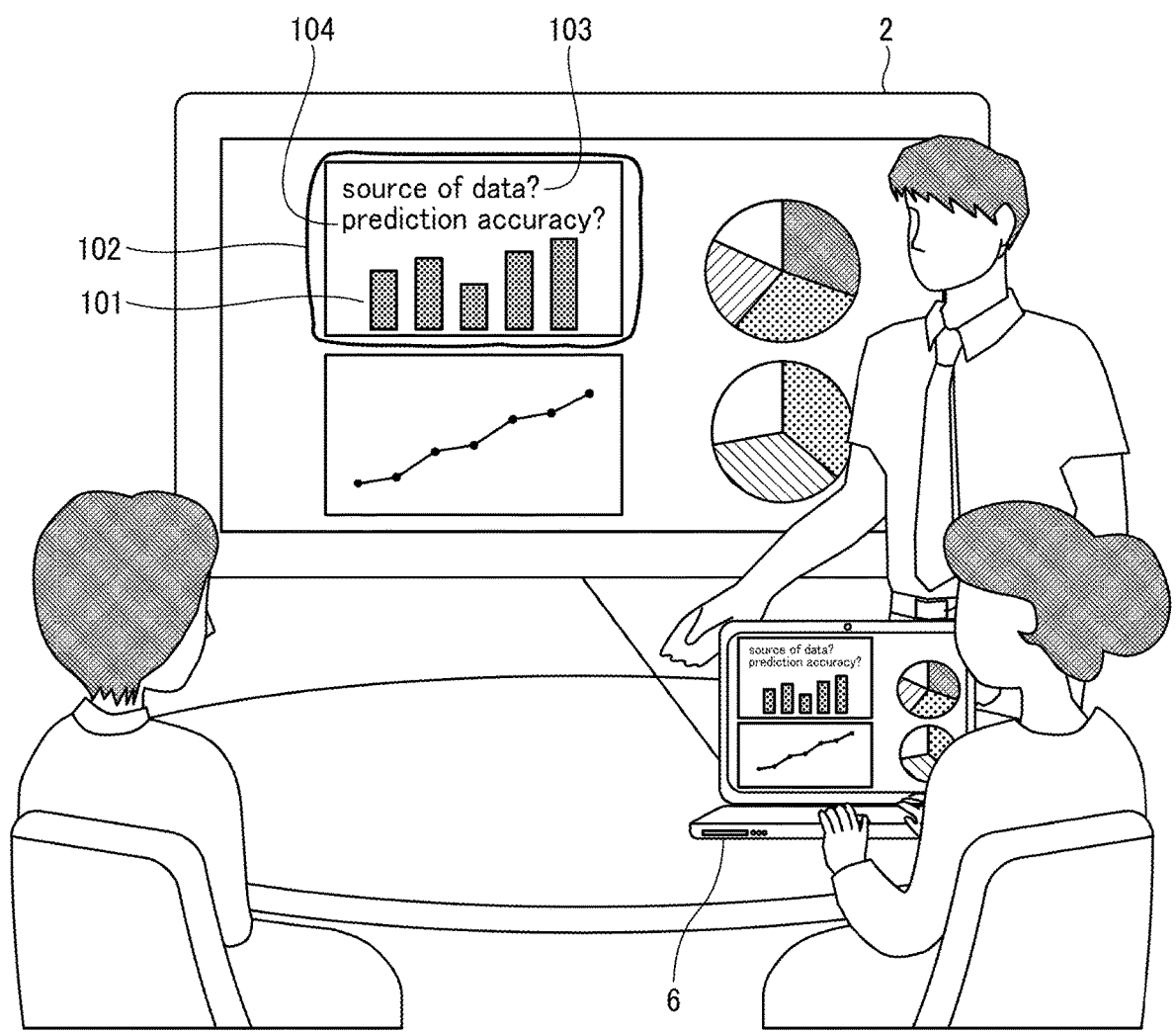
FIG. 1 is a diagram for explaining an operation for searching for information performed by a display apparatus according to an exemplary embodiment of the disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

A description is given below of a display apparatus and a display method performed by the display apparatus according to embodiments of the present disclosure, with reference to the attached drawings.

Overview of Operation of Searching for Information:

With reference to FIG. 1, an overview of a process in which a display apparatus 2 searches for information is described below. FIG. 1 is a diagram for explaining an operation for searching for information performed by the display apparatus 2 according to an embodiment.

(1) A presenter connects a laptop personal computer (PC) 6 to the display apparatus 2 to display a file of "Project Proposal" on the display apparatus 2.

(2) In FIG. 1, a statistical graph 101 of market prediction in the file is displayed.

(3) For example, when the presenter selects the statistical graph 101 with a frame 102 and performs a hand drafted input including a handwriting input of handwritten data 103 representing "source of data?" in the vicinity of the selected statistical graph 101, the handwritten data 103 is converted into a digital signal by character recognition.

(4) The display apparatus 2 determines that the search intent, namely what is to be searched for, is the source of the statistical graph 101, based on a result of the character recognition. The display apparatus 2 acquires copyright information on a web site having the same or similar information as the statistical graph 101 according to a feature of the statistical graph 101 enclosed with the frame 102.

(5) Similarly, when the presenter performs a hand drafted input including a handwriting input of handwritten data 104 representing "prediction accuracy?", the display apparatus 2 converts the handwritten data 104 into a digital signal by character recognition. The display apparatus 2 determines that the search intent, namely what is to be searched for, is a statistical graph similar to the statistical graph 101 based on a result of the character recognition, analyzes other information on a web site having information that is the same as or similar to the statistical graph 101, and present a similar statistical graph. The similar statistical graph allows a user to estimate how much degree the prediction of the statistical graph 101 is correct.

As described above, the display apparatus according to the present embodiment can search for a similar image to an image input from the outside, based on the image or a feature of the image input from the outside, convert the handwritten data into text data, and provide, according to the text data, information with respect to the image input from the outside.

TERMS

"Input device" refers to any devices with which a user hand drafted input is performable by designating coordinates on a touch panel. Examples of the input device include, but are not limited to, a pen, a human finger, a human hand, and a bar-shaped member.

A series of user operations including engaging a writing/drawing mode, recording movement of an input device or portion of a user, and then disengaging the writing/drawing mode is referred to as a stroke. The engaging of the writing/drawing mode may include, if desired, pressing an input device against a display or screen, and disengaging the writing mode may include releasing the input device from the display or screen. Alternatively, a stroke includes tracking movement of the portion of the user without contacting a display or screen. In this case, the writing/drawing mode may be engaged or turned on by a gesture of a user, pressing a button by a hand or a foot of the user, or otherwise turning on the writing/drawing mode, for example using a pointing device such as a mouse. The disengaging of the writing/drawing mode can be accomplished by the same or different gesture used to engage the writing/drawing mode, releasing the button, or otherwise turning off the writing/drawing mode, for example using the pointing device or mouse. "Stroke data" refers to data based on a trajectory of coordinates of a stroke input with the input device. The stroke data may be interpolated appropriately. "Hand drafted data" is data having one or more stroke data, namely including stroke data corresponding to one or more strokes. The hand drafted data includes handwritten data. In the present disclosure, a "hand drafted input" relates to a user input such as handwriting, drawing, and other forms of input. The hand drafted input may be performed via touch interface, with a tactile object such as a pen or stylus or with the user's body. The hand drafted input may also be performed via other types of input, such as gesture-based input, hand motion tracking input or other touch-free input by a user. The hand drafted input includes handwriting input.

The following discussion will refer to handwriting input and handwritten data, but other forms of hand drafted input may be utilized and are within the scope of the present disclosure. That is, the handwriting input and handwritten data may be alternatively referred to as "hand drafted input," and "hand drafted data," respectively.

An "object" refers to an item displayed on a screen. The term "object" in this specification represents an object of display. Examples of "object" include objects displayed based on stroke data, objects obtained by handwriting recognition from stroke data, graphics, images, characters, and the like.

The text data converted from the handwritten data by character recognition is one or more characters processed by a computer. The text data actually is one or more character codes. The characters include numbers, alphabets, and symbols, for example.

The text data may include data representing a stamp, which is displayed as a fixed character meaning such as "done" or a mark, a shape, such as a circle or a star, or a straight line.

"Web site" generally refers to a collection of web pages under a particular domain name. The web site is also referred to as a home page.

"Search intent" indicates what is intended to be searched, in other words, search conditions are determined based on the search intent.

The search intent is, for example, information, such as a search key to be used for targeting what to be searched and searching.

Figure 2:
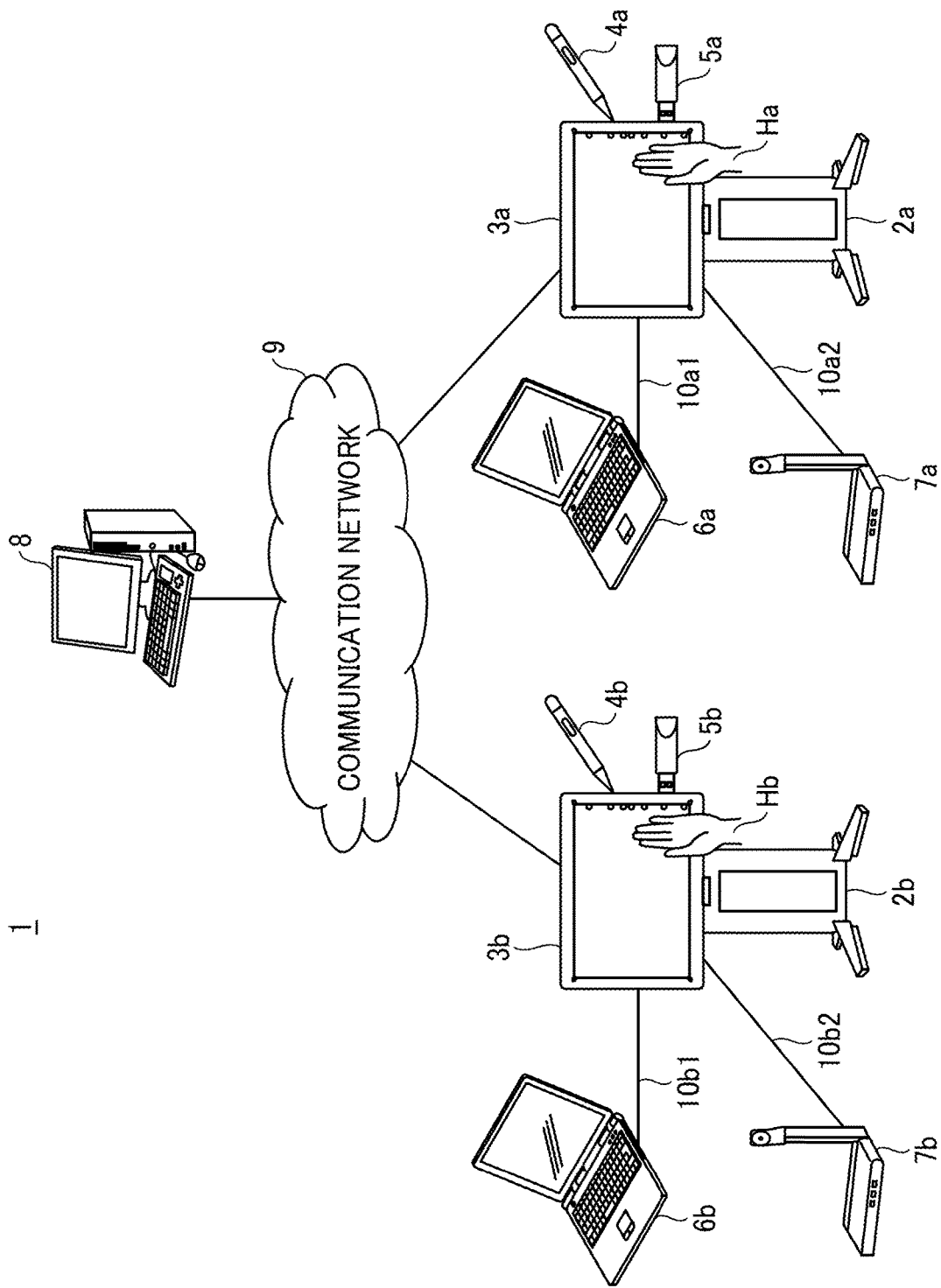
FIG. 2 is a schematic diagram illustrating an overview of a communication system according to the exemplary embodiment of the disclosure.

System Configuration:

FIG. 2 is a schematic diagram illustrating an overview of a communication system 1 according to the present embodiment of the disclosure. FIG. 2 illustrates one example in which the communication system 1 includes two display apparatuses 2a and 2b (also collectively referred to as "display apparatuses 2") and two electronic pens 4a and 4b (also collectively referred to as "electronic pens 4"). However, the number of display apparatuses and the number of electronic pens may be three or more.

As illustrated in FIG. 2, the communication system 1 includes the plurality of display apparatuses 2a and 2b, the plurality of electronic pens 4a and 4b, universal serial bus (USB) memories 5a and 5b, laptop PCs 6a and 6b, videoconference terminal (teleconference terminal) 7a and 7b, and a PC 8. The display apparatuses 2a and 2b and the PC 8 are communicably connected to each other via a communication network 9. Further, the display apparatuses 2a and 2b include displays 3a and 3b, respectively.

The display apparatus 2a displays, on the display 3a, an image drawn by an event generated by the electronic pen 4a (e.g., a touch of the top or bottom of the electronic pen 4a on the display 3a). The display apparatus 2a may change the image being displayed on the display 3a, according to an event made by the user's hand Ha in addition to the electronic pen 4a. An example of the event is a user hand gesture indicating enlargement, reduction, or page turning.

The USB memory 5a is connectable to the display apparatus 2a. The display apparatus 2a can read electronic files in, for example, a portable document format (PDF) from the USB memory 5a or can store an electronic file in the USB memory 5a. The display apparatus 2a is connected to the laptop PC 6a via a cable 10a1 in compliance with communications standard such as DISPLAYPORT, a digital visual interface (DVI), and HIGH-DEFINITION MULTIMEDIA INTERFACE (HDMI), or Video Graphics Array (VGA). On the display apparatus 2a, an event is caused by a user operation of making contact with the display 3a, and event information indicating the event is transmitted to the laptop PC 6a in a similar manner to an event caused by a user operation of inputting with an input device, such as a mouse and a keyboard. In a substantially the same manner, the videoconference terminal (teleconference terminal) 7a is connected to the display apparatus 2a via the cable 10a2 supporting communications using the above-described standard. Alternatively, the laptop PC 6a and the videoconference terminal 7a may communicate with the display apparatus 2a through wireless communications in compliance with various kinds of radio communication protocols such as BLUETOOTH.

At another site where the display apparatus 2b is provided, in a similar manner to the above, the display apparatus 2b including the display 3b, the electronic pen 4b, the USB memory 5b, the laptop PC 6b, the videoconference terminal 7b, a cable 10b1, and a cable 10b2 are used. In addition, an image displayed on the display 3b can be changed according to an event caused by a user operation using a hand Hb of a user, for example.

Accordingly, an image that is drawn on the display 3a of the display apparatus 2a at one site is also displayed on the display 3b of the display apparatus 2b at the other site. By contrast, an image drawn on the display 3b of the display apparatus 2b at the other site is also displayed on the display 3a of the display apparatus 2a at the one site. As described above, the communication system 1 operates for sharing the same image between remotely located sites and, using the communication system 1 in a videoconference conducted between remotely located sites is very convenient, accordingly.

In the following, the "display apparatus 2" refers to any one of the plurality of display apparatuses 2. Similarly, the "display 3" refers to any one of the plurality of displays 3a and 3b. The "electronic pen 4" refers to any one of the plurality of electronic pens 4. The "USB memory 5" refers to any one of the plurality of USB memories 5. The "laptop PC 6" refers to any one of the plurality of laptop PCs 6a and 6b. Any one of the plurality of videoconference terminals 7 may be referred to as the "videoconference terminal" 7. Any one of the multiple hands of users may be referred to as the "hand H." Any one of the multiple cables may be referred to as the "cable 10".

In the present embodiment, the display apparatus 2 is, but not limited to, an electronic whiteboard. Other examples of the display apparatus 2 include an electronic signboard (digital signage), a telestrator that is used, for example, in sports and weather broadcasts, and a remote image (video) diagnostic apparatus. The laptop PC 6 is an example of an external device. The external device may be any terminal that supplies image frames, and examples thereof include a desktop PC, a tablet PC, a personal data assistance (PDA), a digital video camera, a digital camera, and a game console. Further, the communication network includes, for example, the Internet, a local area network (LAN), and a mobile communication network. In the present embodiment, the USB memory 5 is used as a recording medium, but the recording medium may be any desired recording medium, such as a secure digital (SD) card.

Figure 3:
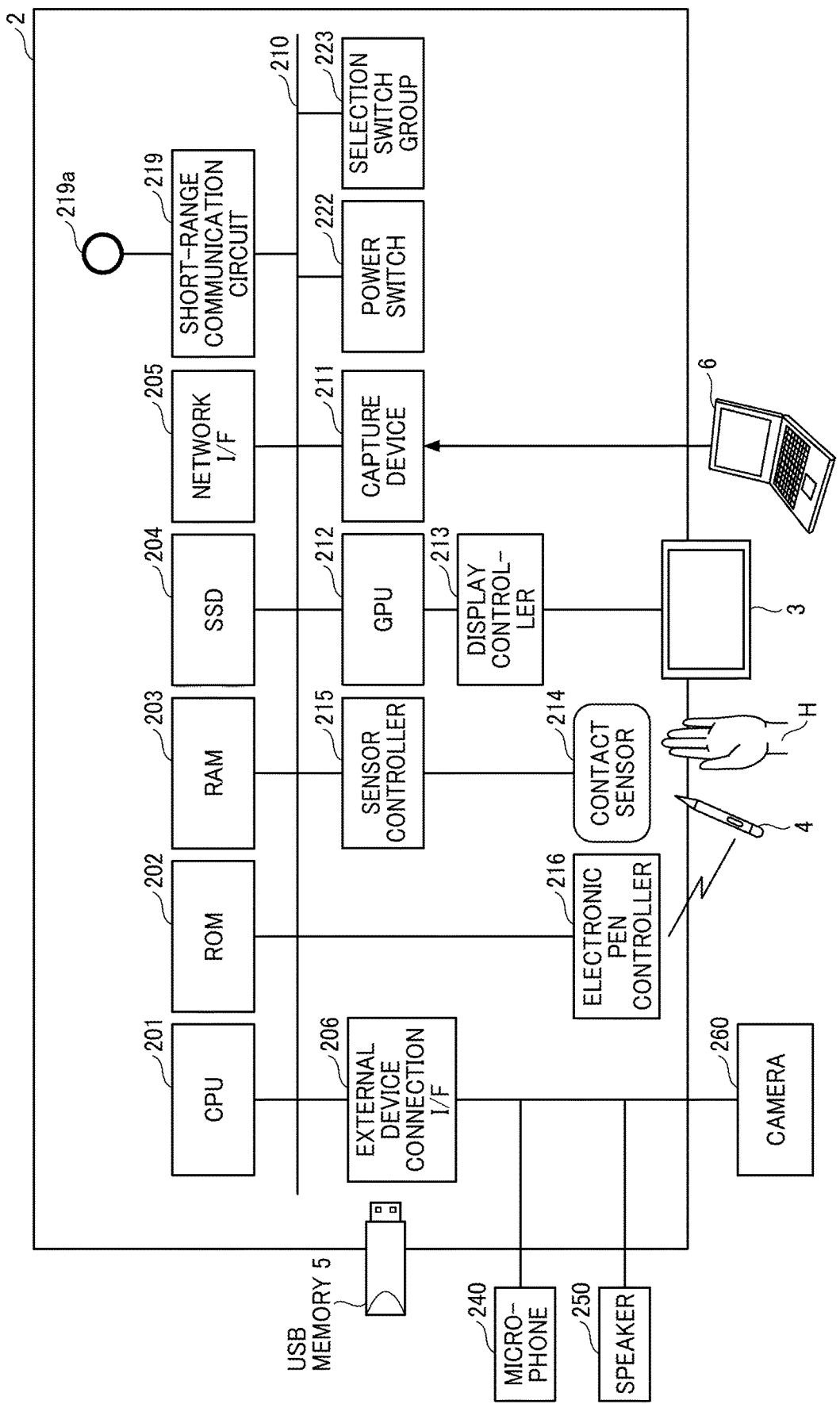
FIG. 3 is a block diagram illustrating an example of a hardware configuration of the display apparatus according to the exemplary embodiment of the disclosure.

Hardware Configuration of Display Apparatus:

A description is given below of a hardware configuration of the display apparatus 2 according to the present embodiment, with reference to FIG. 3. FIG. 3 is a diagram illustrating an example of the hardware configuration of the display apparatus 2 according to the present embodiment. As illustrated in FIG. 3, the display apparatus 2 includes a central processing unit (CPU) 201, a read only memory (ROM) 202, a random access memory (RAM) 203, a solid state drive (SSD) 204, a network interface (I/F) 205, and an external device connection I/F 206.

The CPU 201 controls overall operation of the display apparatus 2. The ROM 202 stores a control program such as an initial program loader (IPL) to boot the CPU 201. The RAM 203 is used as a work area for the CPU 201.

The SSD 204 stores various data such as an operating system (OS) and a program for the display apparatus 2. The program may be an application program that runs on an information processing apparatus equipped with a general-purpose OS such as WINDOWS, MAC OS, ANDROID, and IOS. In this case, the display apparatus 2 is usually used as a general-purpose information processing apparatus. However, when a user executes an installed application program, the display apparatus 2 receives handwriting or the like performed by the user similarly to a dedicated display apparatus.

The network I/F 205 controls communication with an external device via the communication network 9. The external device connection I/F 206 is an interface for connecting various external devices. In the example of FIG. 3, such external devices are the USB memory 5 and other external devices (a microphone 240, a speaker 250, and a camera 260).

The display apparatus 2 further includes a capture device 211, a graphics processing unit (GPU) 212, a display controller 213, a contact sensor 214, a sensor controller 215, an electronic pen controller 216, a short-range communication circuit 219, an antenna 219a of the short-range communication circuit 219, a power switch 222, and a selection switch group 223.

The capture device 211 causes a display of the laptop PC 6 to display a still image or a moving image, or a video image based on image data captured by the capture device. The GPU 212 is a semiconductor chip dedicated to graphics. The display controller 213 controls screen display to output an image processed by the GPU 212 to the display 3. The contact sensor 214 detects a touch made onto the display 3 with the electronic pen 4 or a user's hand H. The sensor controller 215 controls operation of the contact sensor 214. The contact sensor 214 inputs and senses a coordinate by using an infrared blocking system. The infrared interception method is a method in which two light receiving elements disposed on both upper side ends of the display 3 emit a plurality of infrared rays in parallel to a surface of the display 3, and a reflector frame surrounding the display 3 reflects the plurality of infrared rays. The light receiving elements receive lights that passes through the same optical path of the emitted infrared rays and are reflected by the reflector frame. The contact sensor 214 outputs an identifier (ID) of the infrared ray that is blocked by an object after being emitted from the light receiving elements, to the sensor controller 215. Based on the ID of the infrared ray, the sensor controller 215 detects a specific coordinate that is touched by the object. The electronic pen controller 216 communicates with the electronic pen 4 to detect contact by the tip or bottom of the electronic pen with the display 3. The short-range communication circuit 219 is a communication circuit that communicates in compliance with the near field communication (NFC) or BLUETOOTH, for example. The power switch 222 turns on or off the power of the display apparatus 2. The selection switch group 223 is a group of switches for adjusting brightness, hue, etc., of display on the display 3.

The display apparatus 2 further includes a bus line 210. The bus line 210 is an address bus or a data bus that electrically connects the elements illustrated in FIG. 3, such as the CPU 201, to each other.

The contact sensor 214 is not limited to the infrared blocking system type, and may be a different type of detector, such as a capacitance touch panel that identifies a contact position by detecting a change in capacitance, a resistance film touch panel that identifies a contact position by detecting a change in voltage of two opposed resistance films, or an electromagnetic induction touch panel that identifies a contact position by detecting electromagnetic induction caused by contact of an object to a display. In addition to or alternative to detecting a touch by the tip or bottom of the electronic pen 4, the electronic pen controller 216 may also detect a touch by another part of the electronic pen 4, such as a part held by a hand of the user.

Figure 4:
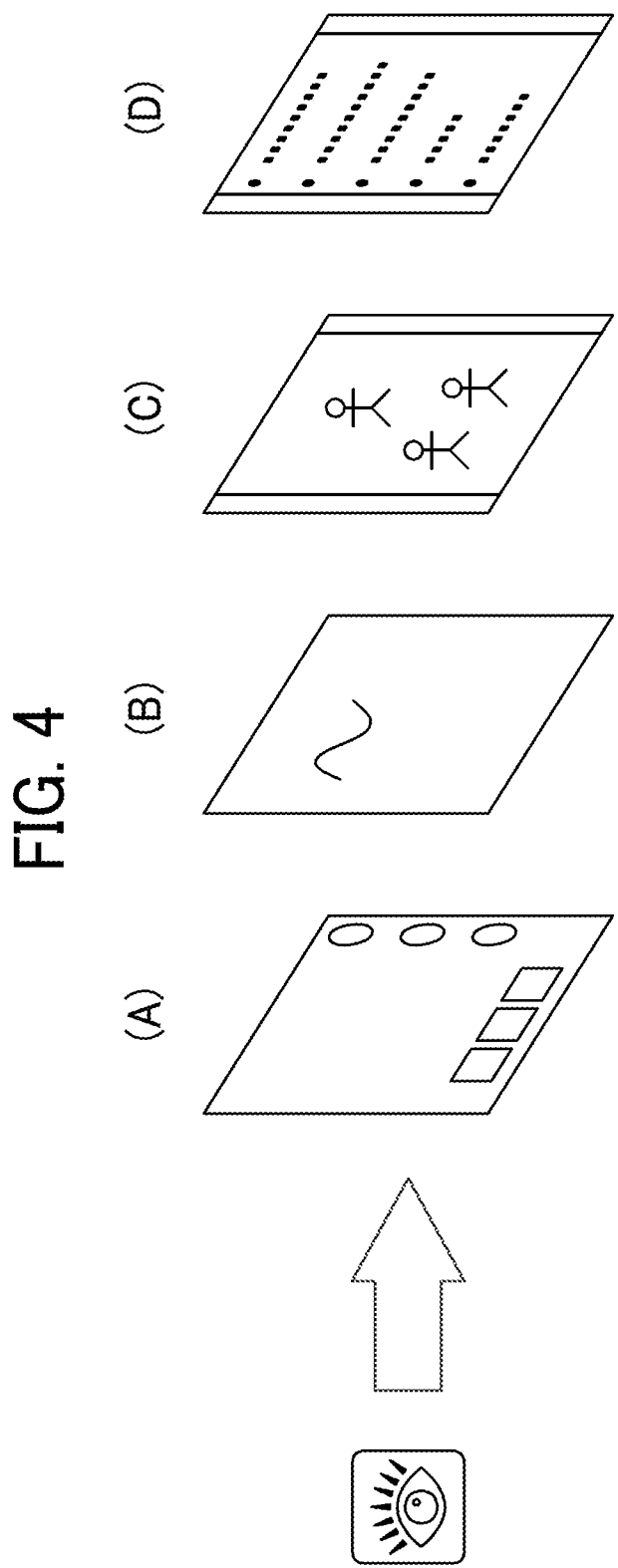
FIG. 4 is an illustration of a configuration of image layers displayed by the display apparatus according to the exemplary embodiment of the disclosure.

Configuration of Layers:

FIG. 4 is an illustration of a configuration of image layers displayed by the display apparatus 2, according to the present embodiment. As illustrated in FIG. 4, the display apparatus 2 displays one image by superimposing a user interface (UI) image (A), a stroke image (B), an output image (C), and a background image (D).

The UI image (A) is an image that displays, for example, menu buttons to be operated by the user.

The stroke image (B) is an image including one or more strokes represented by corresponding stroke data (hand drafted data) input by user hand drafted input.

The output image (C) is an image (still image, moving image) input by an external device (for example, laptop PC 6). The external device includes a server and the USB memory 5, and a web page and a moving image of recording medium are also included in the output image (C).

The background image (D) is an image such as a solid image or a grid image, which is stored in advance and serves as a background image for a hand drafted input. Note that an image stored in advance such as a saved still image can be a background image.

The display apparatus 2 can also selectively display four layers. For example, one or more images among the UI image (A), the stroke image (B), the output image (C), and the background image (D) can be displayed.

Figure 5A:
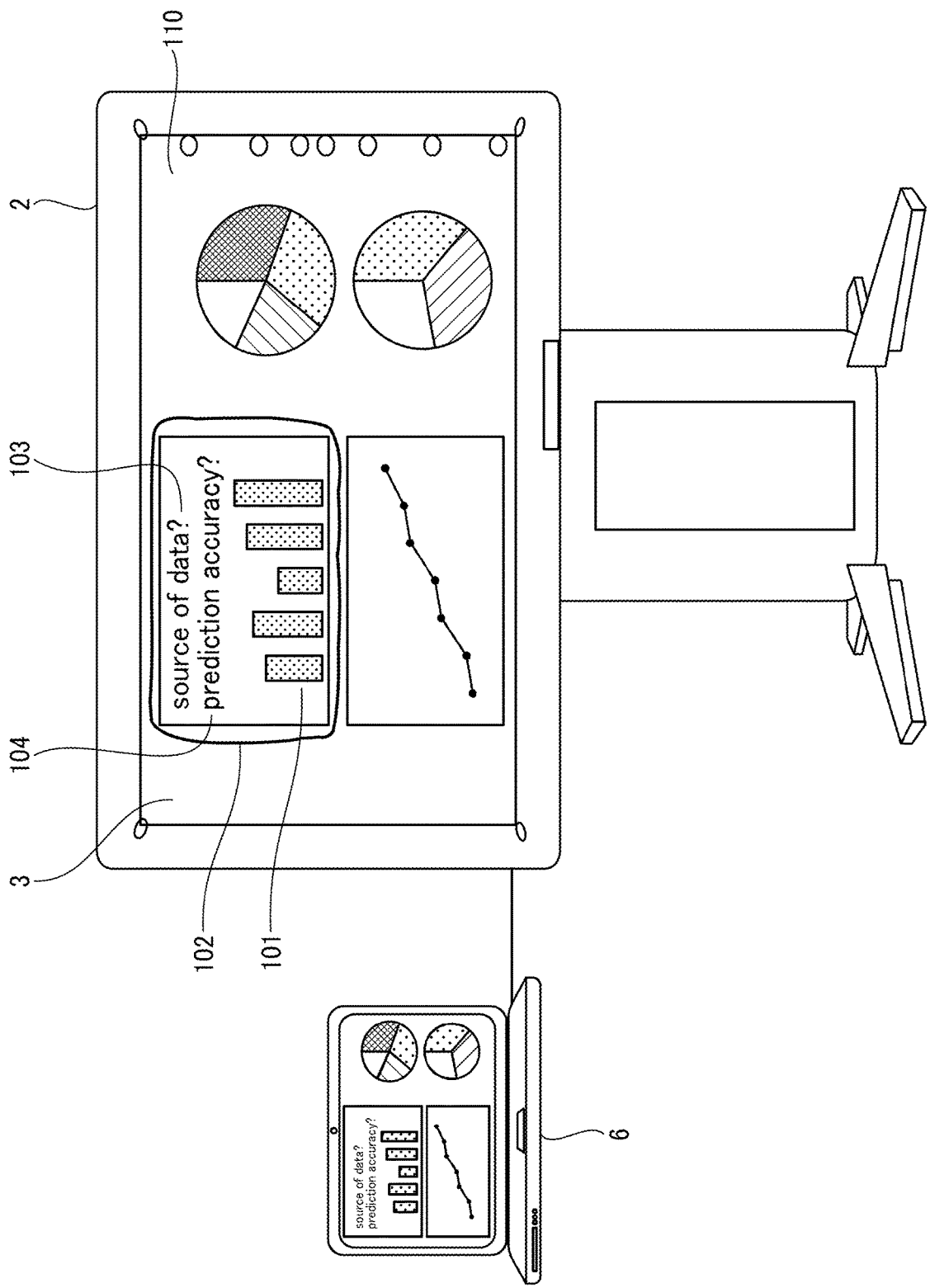
FIG. 5A and FIG. 5B are diagrams each illustrating a display example of an external image according to the exemplary embodiment of the disclosure.
Figure 5B:
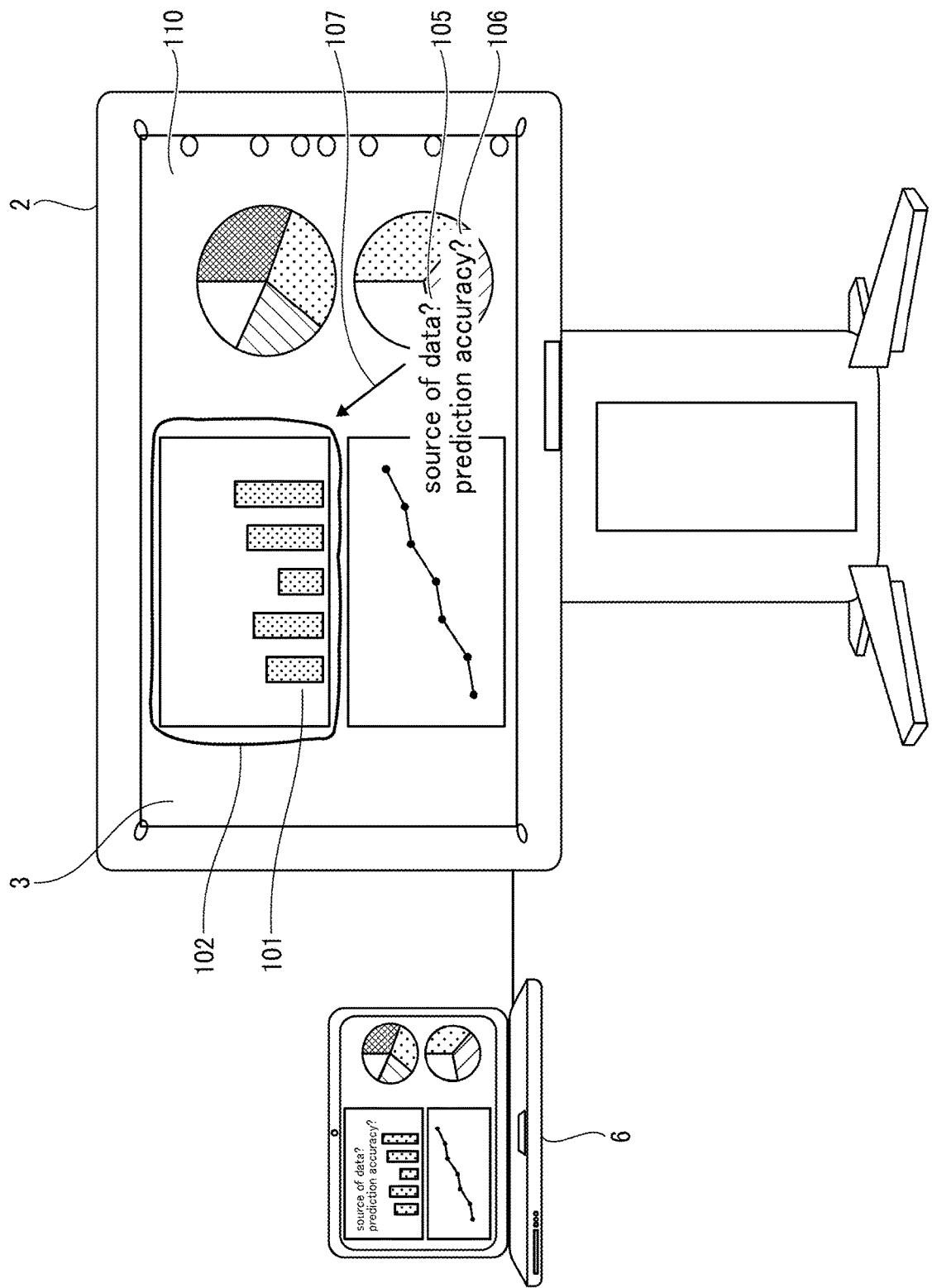

Display Example of External Image:

FIG. 5A and FIG. 5B are diagrams each illustrating a display example of an external image according to the present embodiment. As illustrated in FIG. 5A, the display apparatus 2 displays an external image 110 displayed on the output image (C) on the entire screen of the display 3 (or may display a reduced image on a part of the display 3).

The user performs hand drafted input of a stroke at any position on the display 3 including the external image 110. In FIG. 5A, the statistical graph 101 is surrounded by the frame 102, and handwritten data 103 of "source of data?" and handwritten data 104 of "prediction accuracy?" are input by hand drafted input performed in an area formed by the frame (hereinafter, referred to as "within the frame"). The handwritten data 103 and the handwritten data 104 in the frame are used to detect the search intent indicating what kind of information with respect to the image within the frame is to be searched. Note that the shape of the frame 102 is not limited to a square or rectangle, and may be a triangle or any other polygon, or a circle. The frame 102 may be a stroke having the start point and the end point are at positions that are substantially the same position. In addition, the frame 102 may be represented by hand drafted data that specifies the area. The frame 102 may define a substantially closed area. The area defined by the frame 102 may not be completely closed. The frame 102 may be defined by a dotted line. The frame 102 may be formed by a plurality of strokes, and the area may be specified by quotation marks, " ", or parentheses, ( ), for example.

As illustrated in FIG. 5B, the handwritten data used for detection of the search intent may not be within the frame. In FIG. 5B, handwritten data 105 and handwritten data 106 are outside the frame 102, and are associated with (connected to) the frame 102 by an arrow 107. The display apparatus 2 uses the handwritten data 105 and the handwritten data 106 associated with the frame 102 to detect the search intent.

In the handwritten data of FIG. 5B, the frame 102 may not be provided. In this case, the display apparatus 2 detects the object (statistical graph 101) of the connection destination of the handwritten data by image processing, and sets the detected object as a feature detection target. As image processing in this case, segmentation for dividing an independent object in a screen is known.

Functions:

FIG. 6 is a block diagram illustrating an example of a functional configuration of the display apparatus 2 according to the present embodiment. As illustrated in FIG. 6, the display apparatus 2 includes an external image input unit 81, a communication image input unit 82, an external image reception unit 83, a superimposed image generation unit 84, a hand drafted data input unit 85, a hand drafted data reception unit 86, a recording data generation unit 87, a display control unit 88, a storage unit 89, a character recognition unit 90, an image feature detection unit 91, a search unit 92, and an intention conversion information storage unit 93. These functional units of the display apparatus 2 are implemented by or are caused to function by operation of any of the hardware components illustrated in FIG. 3 in corporation with instructions from the CPU 201 according to a program expanded from the SSD 204 to the RAM 203, for example.

The external image input unit 81 is implemented by execution of a program by the CPU 201 and the capture device 211, for example, and receives input of an external image including a moving image continuously transmitted by the laptop PC 6.

The input external image is mainly an image of a screen displayed on the display of the laptop PC 6, but stored content may be transmitted to the display apparatus 2.

The communication image input unit 82 is implemented by execution of a program by the CPU 201 and the network I/F 205, for example, and receives an input of an external image including a moving image transmitted through a communication established by such as a wireless LAN, a wired LAN, or MIRACAST.

The external image input unit 81 and the communication image input unit 82 input the external image to the external image reception unit 83. The external image reception unit 83 inputs at least one of the external image input by the external image input unit 81 and the external image input by the communication image input unit 82 to the superimposed image generation unit 84.

The hand drafted data input unit 85 is implemented by execution of a program by the CPU 201 and the contact sensor 214, for example, and receives an input of a coordinate point sequence input by the input device. The hand drafted data input unit 85 inputs a sequence of coordinate points to the hand drafted data reception unit 86.

The hand drafted data reception unit 86 generates stroke data based on the coordinate point sequence input from the hand drafted data input unit 85. The hand drafted data reception unit 86 interpolates the coordinate point sequence and generates stroke data with set thickness and color. The hand drafted data reception unit 86 inputs the stroke data to the superimposed image generation unit 84 and the character recognition unit 90.

The superimposed image generation unit 84 superimposes, or synthesizes, the hand drafted data including handwritten data input from the hand drafted data reception unit 86 on the external image input from the external image reception unit 83 to generate output data to be output to the display 3, and inputs the output data to the recording data generation unit 87 and the display control unit 88. In addition, the superimposed image generation unit 84 synchronizes the image in which the handwritten data is superimposed on the external image with the audio data. Thus, the recording data generation unit 87 can store the hand drafted data together with sound.

In response to a user operation of capturing an external image, the recording data generation unit 87 stores a still image or a moving image in the storage unit 89. The display control unit 88 causes the display 3 to display the output data.

The character recognition unit 90 converts the hand drafted data including the handwritten data input from the hand drafted data reception unit 86 into text data by character recognition. The character recognition unit 90 can decompose the text data into words with parts of speech by morphological analysis. Various algorithms for character recognition have been developed, and any algorithm may be used for character recognition in the present embodiment. As an example, a method using deep learning is described later. The character recognition unit 90 inputs the text data to the search unit 92.

The image feature detection unit 91 detects the frame 102 based on the hand drafted data input from hand drafted data reception unit 86. Although detection of the frame 102 may not be performed, for convenience of explanation, it is assumed that the frame 102 is made by hand drafted input. The image feature detection unit 91 extracts an image within the frame based on the external image input from the external image reception unit 83. The image feature detection unit 91 may input the image within the frame to the search unit 92 as it is, or may detect a feature from the image within the frame and then input the feature to the search unit 92 together with the image or the feature alone.

The information input to the search unit 92 through the above-described operation is:

1. The text data and the image within the frame; 2. The text data and the feature of the image within the frame; or 3. The text data, the image within the frame, and the feature of the image within the frame.

The image feature detection unit 91 can generate a color histogram as the feature of the image. In addition, the image feature detection unit 91 can also perform optical character recognition (OCR) processing on the image within the frame and use the obtained character data (referred to as "character data" in distinction from text data converted from the handwritten data) as the feature of the image.

Note that a classifier generated by pattern matching or machine learning, which is described later, may be used for the detection of the frame 102 and the detection of the feature.

The search unit 92 refers to the intention conversion information, which is described later with reference to FIG. 8, and determines the search intent associated with the text data. In addition, the search unit 92 inputs information used for search associated with the text data to a search engine, and searches for information on the Internet. A known web site as a search engine may be used (for example, GOOGLE.COM).

Character Recognition on Hand Drafted Data and Detection of Feature of Image within Frame:

As a method of character recognition performed on the hand drafted data including the handwritten data and detection of the feature of the image within the frame, machine learning or pattern matching may be used. The machine learning is a technique for causing a computer to acquire human-like learning capability, and refers to a technique in which a computer autonomously generates an algorithm necessary for determination of data identification or the like from learning data acquired in advance, and applies the algorithm to new data to perform prediction. Any suitable learning method is applied for machine learning, for example, any one of supervised learning, unsupervised learning, semi-supervised learning, reinforcement learning, and deep learning, or a combination of two or more those learning. The pattern matching is a method of determining, based on one or more prepared patterns to be specified, whether a specific pattern appears or not, and, if the specific pattern appears, where the specific pattern appears, in searching data.

Figure 7:
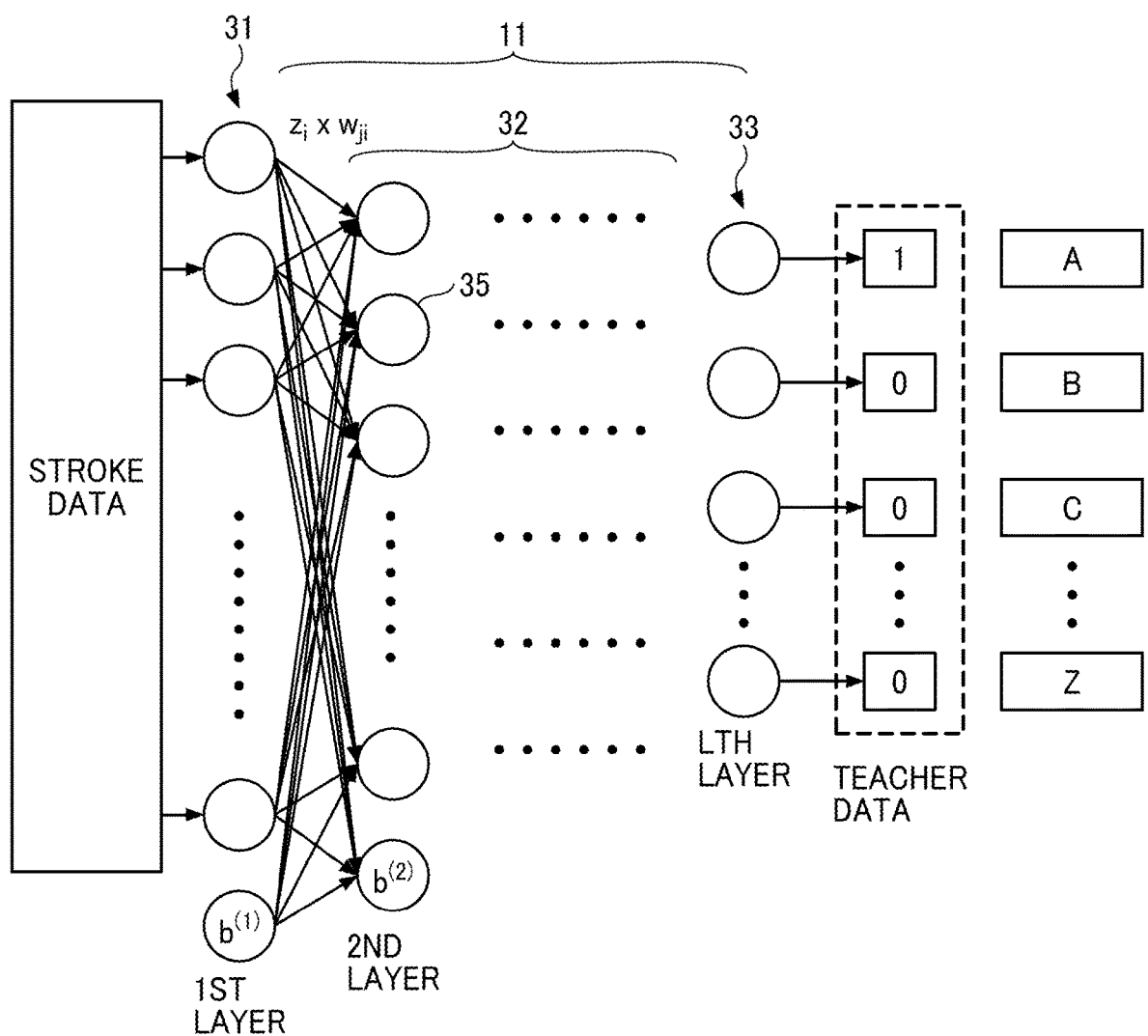
FIG. 7 is a diagram illustrating an example of a neural network in which L layers from an input layer to an output layer are connected according to the exemplary embodiment of the disclosure.

FIG. 7 is a diagram illustrating a neural network 11 in which L layers from an input layer 31 to an output layer 33 are connected, according to the present embodiment. A neural network having layers in deep is referred to as a deep neural network (DNN). Each layer between the input layer 31 and the output layer 33 is referred to as an intermediate layer 32. The number of layers, the number of nodes 35, and the like are merely examples.

In case of the character recognition performed on the hand drafted data, the stroke data (coordinate point sequence) is input to the input layer 31. Since the stroke data is continuously inputted, a coordinate point sequence having a certain number of coordinate points is inputted. The number of nodes corresponding to the output layer 33 is the number of categories to be classified. For example, in case of classification into characters, the number of nodes is 26 corresponding to the number of letters of alphabet in English. Such classification may be performed for word units, in alternative to character units, and in this case, the number of nodes is the number of words. In case of Japanese, the number of characters of hiragana, katakana, or kanji is the number of nodes of the output layer 33.

In case of the detection of the feature of the image within the frame, the image within the frame (pixel value of each pixel) is input to the input layer 31. A pre-processing unit may divide the image within the frame into squares. The number of nodes corresponding to the output layer 33 is the number of categories to be classified. For example, in case of classifying what is captured in the image within the frame (subject), the number of types of subjects to be classified is used. For example, various classifications such as a person, a car, a train, an animal, a bar graph, a pie graph, a line graph, and a figure are possible.

In addition, the image feature detection unit 91 can also detect a texture (for example, texture of mesh, diagonal lines, wood, iron, or glass) of the image within the frame using a neural network.

Accordingly, as the feature of the image within the frame, for example, the following can be obtained.

Color histogram—Character data (obtained by OCR processing)

Subject—Texture

In the neural network 11, a node 35 that is one of the nodes of a l-th layer (l: 2-L) is connected to all the nodes 35 of an l−1-th layer, and a product of an output z and weight w of a connection of the node 35 of the l-th layer is input to the node of the l-th layer.

An activation function is arranged in each node of the l-th layer, and at the node 35 of the l-th layer, an input value is converted to a value in a range of 0 to 1 by using the activation function and output to the node 35 of an l+1-th layer. This processing is repeated from the input layer 31 to the output layer 33. As the activation function, for example, ReLU, tan h, and sigmoid are known. Each node of the input layer 31 merely transmit a feature vectors to a second layer and is not activated.

In the present embodiment, the outputs of the nodes of the output layer 33 are classified into text data (characters or words) or the feature of the image, a prediction problem of classification is used in the machine learning. Accordingly, the activation function of the nodes of the output layer 33 may be a softmax function. An error between an output of each node of the output layer and a teacher signal (a one-hot vector in which one node of correct classification is 1 and the other nodes are 0) is obtained by cross entropy, and the weight w and a bias b of the connection are updated (learned) so that the output of the output layer 33 approaches the teacher signal.

A recurrent neural network (hereinafter referred to as an RNN) may be applied to classification of continuous data such as stroke data and audio data. The RNN is an extension of the neural network so as to handle time-series data. In addition, a convolutional neural network (CNN or ConvNet) is known as being effective for classification of images.

Machine learning methods include, for example, perceptron, support vector machine, logistic regression, naïve Bayes, decision tree, and random forest, and the method described in the present embodiment is not limiting.

Detection of Search Intent:

The search unit 92 may mainly use a noun of the text data as the search intent, or may convert the text data into the search intent. FIG. 8 is a diagram illustrating intention conversion information for converting the text data into the search intent, and is stored in the intention conversion information storage unit 93. A search condition is determined based on the search intent. The text data of the intention conversion information may be at least a part of text data representing text corresponding to words spoken by the user. The text data of the intention conversion information may be, for example, a noun obtained by morphological analysis.

Based on the intention conversion information, for example, text data "source of data" is converted into the search intent indicating a "copyright of a web site having the image within the frame." In this case, the information used for the search is the image within the frame. What is to be searched for is the copyright of the web site. Since the copyright indicates an author, the search unit 92 can search who created the image within the frame.

Further, the text data "prediction accuracy" is converted into the search intent indicating "search for a similar image in the web site having the image within the frame." In this case, the information used for the search is the image within the frame. What is to be searched for is an image in the web site. If there is, for example, a similar statistical graph in the web site in which the image within the frame is present, a degree of accuracy of the image within the frame can be estimated based on knowledge of the user, for example.

Further, the text data "confirm" is converted into the search intent "reliability of character data in the image within the frame." In this case, the information used for the search is the feature (character data) of the image. Further, information on the Internet is to be searched, and what is to be searched for may be narrowed down by an image or a character in the frame. When the search unit 92 searches the web site with a character described in the frame, a web site having a high relevance ratio is hit. The user can estimate a degree of accuracy of the information described in the image within the frame based on his or her knowledge.

Further, the text data "obtain original" is converted into the search intent indicating "acquisition of a high-quality image corresponding to the image within the frame." In this case, the information used for the search is the image within the frame and the features of the image (color histogram, texture). Further, information on the Internet is to be searched, and what is to be searched for may be narrowed down by an image or a character in the frame. There is a case where the original image data is desired to be obtained by the user due to a low resolution of the image within the frame. The search unit 92 searches the web site by using the image within the frame and further narrows down the web site by the features (color histogram, texture) of the image. The user can determine the original image that is the source of the image within the frame by comparing the image with the image within the frame.

Further, the text data "details" is converted into the search intent indicating "acquisition of detailed information of a web site having the image within the frame." In this case, the information used for the search is the image and the text data within the frame. What is to be searched for is the contents of the web site. There is a case where detailed information of the image within the frame is desired to be obtained by the user. The search unit 92 searches for the web site using the image within the frame, and further acquires information on the web site using the text data (particular text data input by hand drafted input subsequent to details).

As described above, the search intent according to the present embodiment is information used for determining what kind of search is to be performed using the image specified by the user, in other words, a search condition using the image specified by the user. The information used for the search in the present embodiment is information obtained based on the image specified by the user.

Process:

FIG. 9 is a sequence diagram illustrating overall operation performed by the communication system 1 according to the present embodiment of the present disclosure.

S1: The laptop PC 6 connected to the display apparatus 2 transmits the external image to the display apparatus 2.

S2: The external image input unit 81 of the display apparatus 2 receives an input of the external image, and inputs the external image to the external image reception unit 83. The external image reception unit 83 inputs the external image to the superimposed image generation unit 84. The external image is displayed on the display 3 by the display control unit 88.

S3: When the user performs a hand drafted input, the hand drafted data input unit 85 receives an input of hand drafted data including handwritten data. The hand drafted data input unit 85 inputs the hand drafted data including the handwritten data to the hand drafted data reception unit 86. The hand drafted data reception unit 86 inputs the hand drafted data including the handwritten data to the superimposed image generation unit 84 and the character recognition unit 90.

S4: The superimposed image generation unit 84 superimposes the hand drafted data including the handwritten data, namely an object corresponding to the hand drafted data, on the external image to generate an image in which the hand drafted data is superimposed on the external image and inputs the superimposed image to the display control unit 88. The display control unit 88 displays the image in which the hand drafted data is superimposed on the external image on the display 3. Note that when the external image is a moving image, the frames are updated one after another, but the superimposed image generation unit 84 repeats the processing of superimposing all the hand drafted data on a frame of a new external image.

Figure 10:
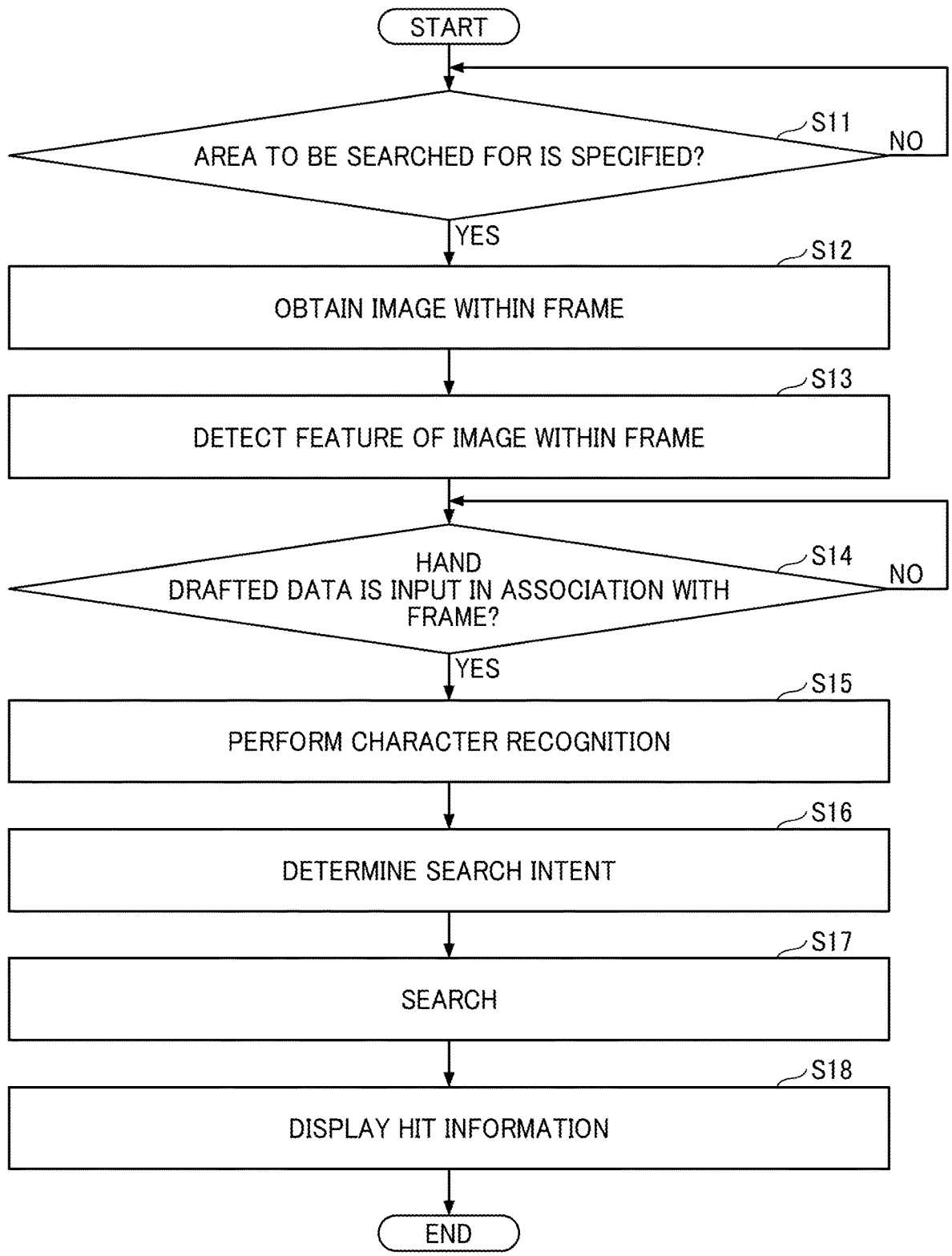
FIG. 10 is a flowchart illustrating a process of searching performed by a search unit according to the exemplary embodiment of the disclosure.

FIG. 10 is a flowchart illustrating a process of searching performed by the search unit 92 according to the present embodiment of the present disclosure. When the hand drafted data is input, the image feature detection unit 91 determines whether an area has been specified (S11). The area is surrounded by the frame 102. In other words, the image feature detection unit 91 detects the frame 102. For example, when the start point and the end point of the stroke are within a certain distance and the area (the area of a circumscribed rectangle of the stroke) is equal to or greater than a certain value, the image feature detection unit 91 determines that the frame 102 is made by hand drafted input. Alternatively, the image feature detection unit 91 may use a result obtained by pattern recognition or machine learning. Prior to detection of the frame 102, an area selection in the menu of the UI image (A) is pressed by the user.

The image feature detection unit 91 acquires an image within the frame (S12). The image within the frame is simply an image inside the inscribed rectangle or the circumscribed rectangle of frame.

The image feature detection unit 91 detects a feature of the image within the frame (S13). The feature of the image within the frame detected includes a color histogram, character data (obtained by OCR processing), a subject, and texture. The image feature detection unit 91 can detect any feature that can be detected from the image.

The character recognition unit 90 determines whether the hand drafted data including the handwritten data is input in association with the frame 102 (for example, in the frame) (S14). "Associated with the frame 102" includes a case where the hand drafted data including the handwritten data is input in the vicinity of the outside of the frame 102 in addition to the case where the hand drafted data including the handwritten data is input in the frame. When there is one object (for example, a statistical graph) alone, the object may not be specified by the user.

When the determination in step S14 indicates Yes, the character recognition unit 90 performs character recognition on the hand drafted data including the handwritten data input in association with the frame 102 (S15).

The search unit 92 determines the search intent based on the text data and the intention conversion information (S16). As a result, the search unit 92 determines the web site as a search destination and the information used for the search.

The search unit 92 searches for the web site as the search destination using the information used for the search (S17). A search for the image within the frame is described below. The search unit 92 transmits the image within the frame to a search engine published on the Web. The search engine analyzes the color, point, line, texture, etc. of the image within the frame and generates a search query (a search sentence including one or more words). The search engine identifies an image similar to the cached image by a certain degree or more based on the search query. The search engine returns search results. The search unit 92 may perform an analysis of colors, points, lines, and textures of the image within the frame performed by the search engine, and pass the analysis result to the search engine.

Regarding the search for character data, the search unit 92 transmits a search query including one or more pieces of character data to the search engine. The search engine specifies the web site including the character data from the cached web sites. The search engine returns search results.

Regarding the search the web site may be performed by substantially the same manner as the search method, except that the search range is limited to the web site.

Since the search unit 92 inputs the search result to the display control unit 88, the display control unit 88 causes the display 3 to display information matching (hit) the information used for the search (S18).

Figure 11:
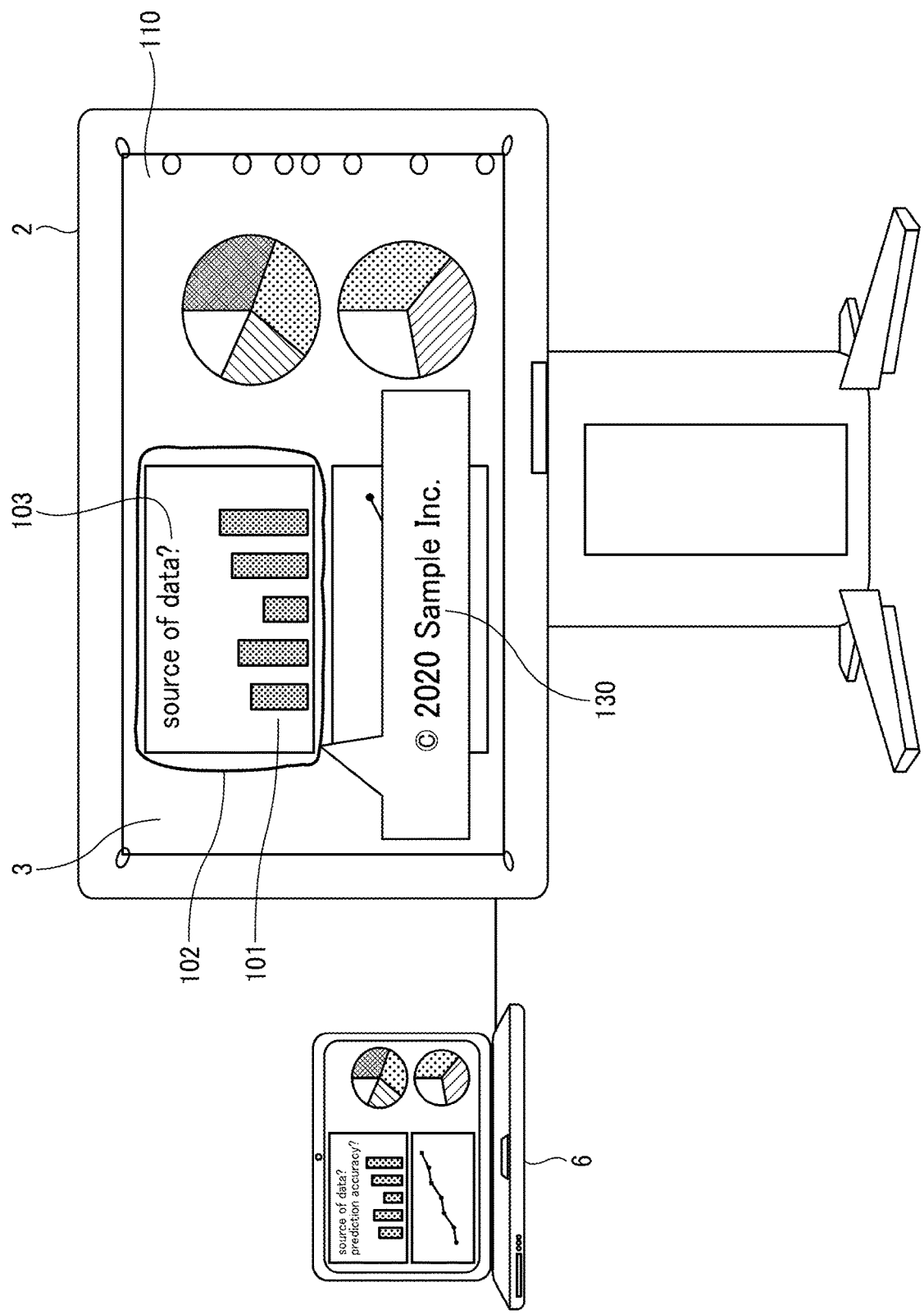
FIG. 11 is a diagram illustrating an example of a search result displayed by the display apparatus according to the exemplary embodiment of the disclosure.

Display Example of Search Result:

FIG. 11 is a diagram illustrating an example of a search result displayed by the display apparatus 2 according to the present embodiment. In FIG. 11, the handwritten data 103 "source of data?" is input by hand drafted input in the statistical graph 101 within the frame.

The search unit 92 converts the handwritten data 103 into the search intent. In this case, the search unit 92 searches for a web site with the statistical graph 101 in the frame and specifies a web site in which the statistical graph 101 is included. Then, the search unit 92 search for a copyright of the web site. Since the copyright is generally described following a "mark of character such as C surrounded by a circle" or characters (character string) of "copyright," the search unit 92 may search for these characters from the web site. Accordingly, in FIG. 11, a copyright 130 "2020 Sample Inc." is displayed.

The display control unit 88 may display the searched information in a pop-up manner or in a blank space. Alternatively, the display control unit 88 may display "searched" in a balloon (icon) at the lower right of the display 3, for example, and may pop-up the searched information according to a user operation.

Note that the display apparatus 2 can search for the web site using the text data converted from the handwritten data without using the intention conversion information. For example, if the user writes "copyright" by hand, the search unit 92 can search for the copyright from the web site that includes the statistical graph 101. As described above, the display apparatus 2 can specify the web site using the image within the frame and acquire information corresponding to the search intent from the web site.

Figure 12:
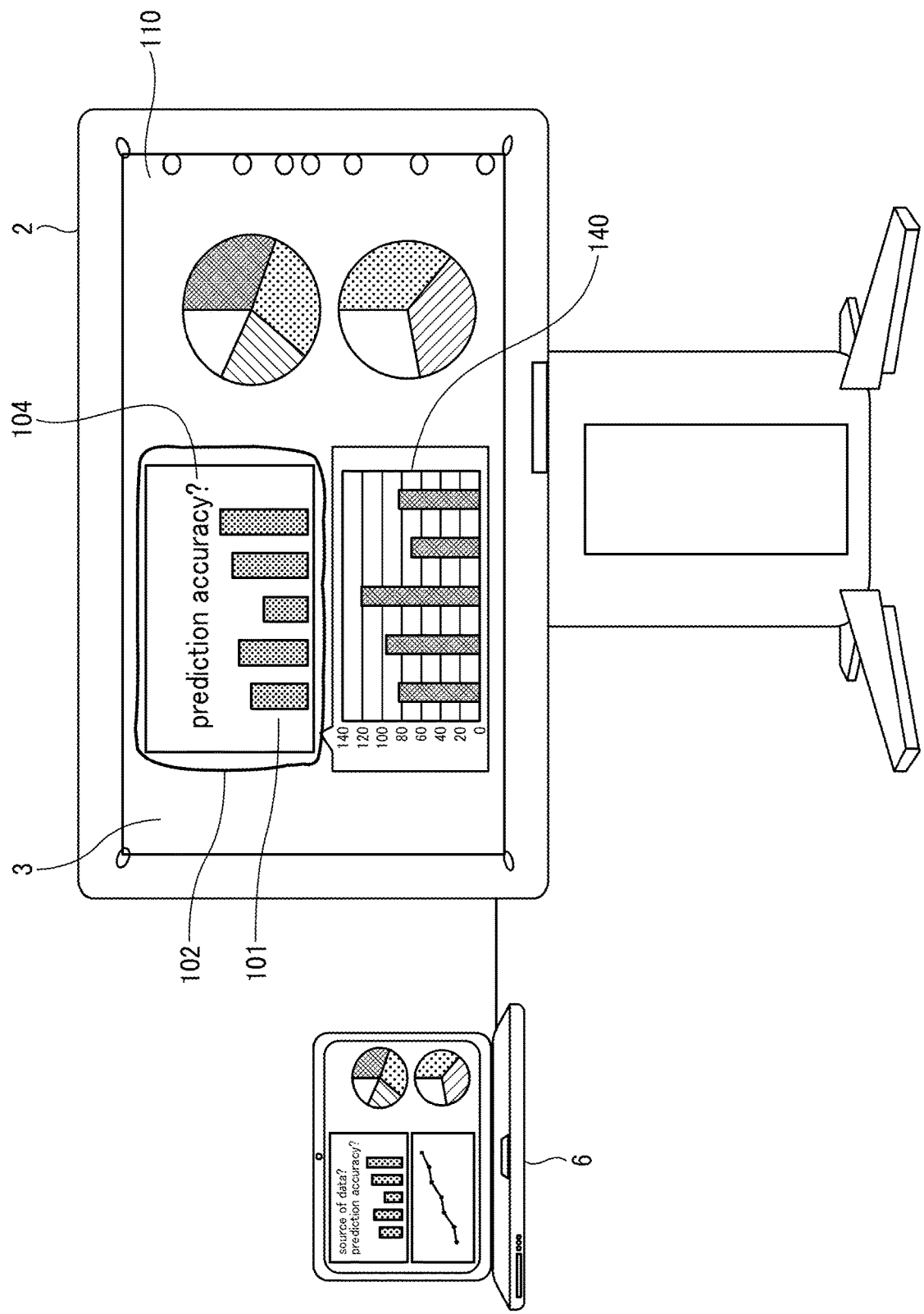
FIG. 12 is a diagram illustrating another example of a search result displayed by the display apparatus according to the exemplary embodiment of the disclosure.

FIG. 12 is a diagram illustrating an example of a search result displayed by the display apparatus 2 according to the present embodiment. In FIG. 12, the handwritten data 104 "prediction accuracy?" is input by hand drafted input in the statistical graph 101 within the frame. The search unit 92 converts the handwritten data 104 into the search intent. In this case, the search unit 92 searches for a web site with the statistical graph 101 in the frame and specifies a web site in which the statistical graph 101 is included. Then, the search unit 92 search for a similar statistic graph in the web site. Accordingly, a bar graph 140 that is different from the statistical graph 101 is displayed in the example of FIG. 12.

Variation:

In the above-described embodiment, the search is performed by the display apparatus 2 alone, but processing related to the search may be performed by an information processing apparatus on a network. Such an information processing apparatus is referred to as a server apparatus.

Figure 13:
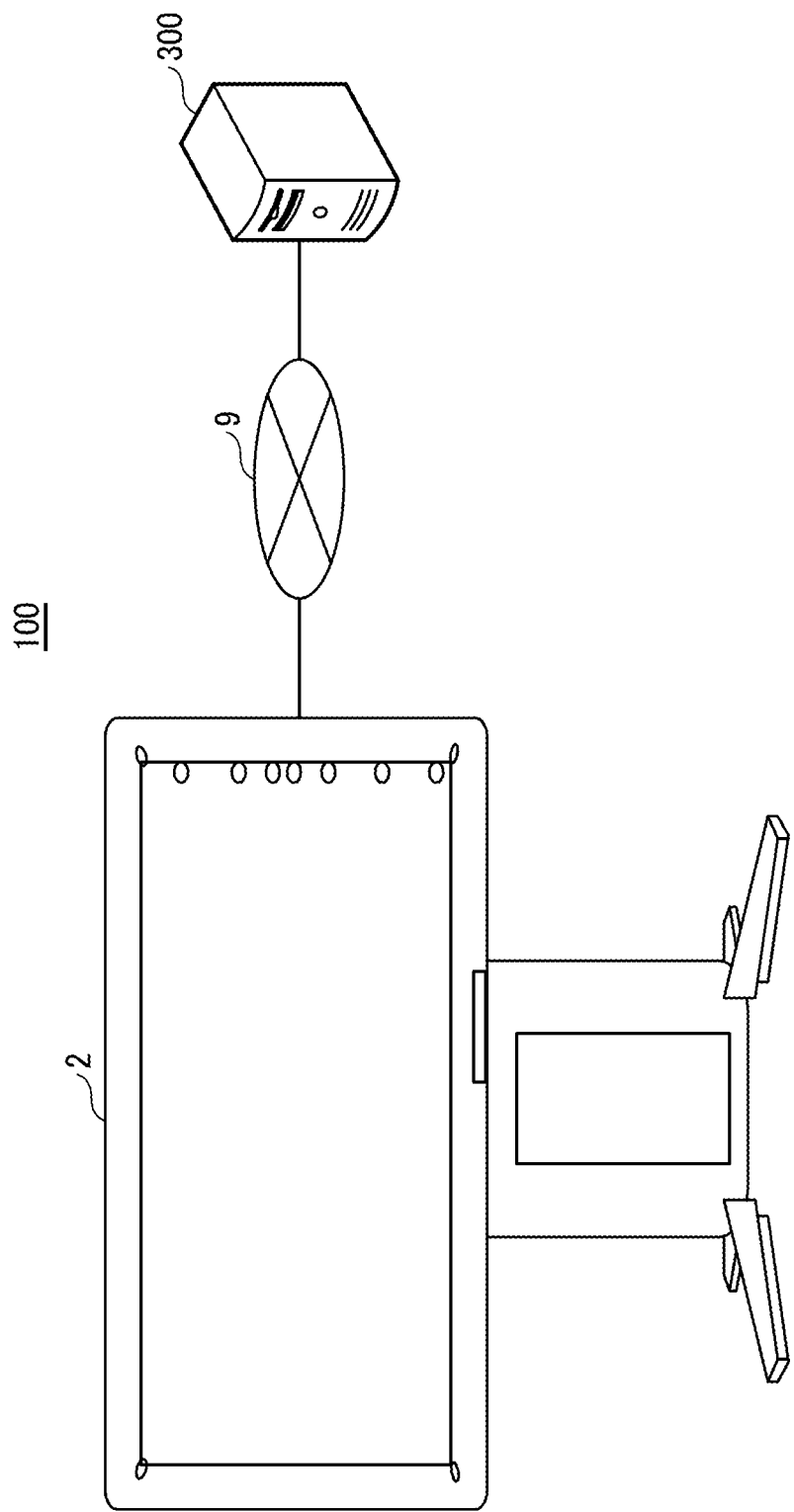
FIG. 13 is a diagram illustrating an example of a configuration of a display system according to another exemplary embodiment of the disclosure.

FIG. 13 is a diagram illustrating an example of a configuration of a display system 100. In the display system 100 of FIG. 13, the display apparatus 2 and an information processing apparatus 300 are communicably connected to each other via the communication network 9. The information processing apparatus 300 is one or more computers and may support cloud computing. In addition, the information processing apparatus 300 may exist on-premises or on the Internet. According to the configuration as illustrated in FIG. 13, the display apparatus 2 can transmit the hand drafted data and the image within the frame to the information processing apparatus 300, and can receive the search result from the information processing apparatus 300.

FIG. 14 is a block diagram illustrating a functional configuration of the display apparatus 2 and the information processing apparatus 300 in the display system 100 of FIG. 13. In the description of FIG. 14, differences from FIG. 6 are mainly described. The display apparatus 2 of FIG. 14 includes a communication unit 74. The communication unit 74 transmits the hand drafted data and the image within the frame to the information processing apparatus 300 in real time, and receives the search result from the information processing apparatus 300.

The information processing apparatus 300 includes a communication unit 75, the character recognition unit 90, the image feature detection unit 91, and the search unit 92. The communication unit 75 receives the hand drafted data and the image within the frame from the display apparatus 2, and transmits the search result to the display apparatus 2. The functions of the character recognition unit 90, the image feature detection unit 91, and the search unit 92 are substantially the same as those in FIG. 6.

FIG. 15 is a flowchart illustrating overall operation performed by the display system 100, in particular the display apparatus 2 included in the display system 100. Processing of each of steps S11 to S14 and processing of step S18 in FIG. 15 are performed substantially in the same manner as the processing of each of steps S11 to S14 and the processing of step S18 in FIG. 10, and the redundant description is omitted. In step S14-2, the communication unit 74 of the display apparatus 2 transmits the hand drafted data and the image within the frame to the information processing apparatus 300. In step S14-3, the communication unit 74 of the display apparatus 2 receives the search result from the information processing apparatus 300.

FIG. 16 is a flowchart illustrating a process of searching performed by the search unit 92 of information processing apparatus 300 included in the display system 100 according to the exemplary embodiment of the disclosure. Processing of each of steps S15 to S17 in FIG. 16 is performed substantially in the same manner as the processing of each of steps S15 to S17 in FIG. 10, and the redundant description is omitted. In step S17-2, the communication unit 75 of the information processing apparatus 300 transmits the search result to the display apparatus 2 in the display system 100.

The above-described configuration allows the information processing apparatus 300 on the network to perform processing related to the search. Since character recognition, image feature detection, and search can be integrally performed by the information processing apparatus 300, maintenance is facilitated.

As described above, the display apparatus 2 according to the present embodiment can search for a similar image to an image externally input, convert the handwritten data into the text data, and provide, according to the text data, information with respect to the image externally input.

Variation:

The above-described embodiment is illustrative and does not limit the present disclosure. Thus, numerous additional modifications and variations are possible in light of the above teachings within the scope of the present disclosure. Any one of the above-described operations may be performed in various other ways, for example, in an order different from the one described above.

For example, the display apparatus 2 converts the handwritten data (hand drafted data) into the text data, but may search by using the handwritten data (hand drafted data) without conversion. In this case, the search engine searches the handwritten data (hand drafted data) as an image.

The display apparatus 2 may convert handwritten data (hand drafted data) into the text data, recognize audio data, and use the text data and the audio data for searching.

Although a detailed description of the text data is omitted from the description of the above-described embodiments, the text data is stored in the display apparatus 2 as character codes, and the handwritten data is stored in the display apparatus 2 as coordinate point data. The data can be saved in various types of storage media or in a memory on a network, to be downloaded from the display apparatus 2 to be reused later. The display apparatus 2 to reuse the data may be any display apparatus 2 and may be a general information processing apparatus. This allows a user to continue a conference or the like by reproducing the hand drafted content on different display apparatuses 2.

In the description above, the display apparatus 2 being an electronic whiteboard is described as an example but is not limited thereto. A device having substantially the same functions as the electronic whiteboard may be referred to as an electronic information board, an interactive board, or the like. The present disclosure is applicable to any information processing apparatus having a touch panel. Examples of the information processing apparatus with a touch panel include, but not limited to, a projector, a data output device such as a digital signage, a head up display, an industrial machine, an imaging device, a sound collecting device, a medical device, a network home appliance, a laptop computer (personal computer or PC), a mobile phone, a smartphone, a tablet terminal, a game console, a personal digital assistant (PDA), digital camera, a wearable PC, and a desktop PC.

In case that the display apparatus 2 is a projector, the display apparatus 2 may detect the coordinates of the pen tip by ultrasonic waves. In this case, the pen emits an ultrasonic wave together with light emission, and the display apparatus 2 calculates a distance based on an arrival time of the ultrasonic wave. The display apparatus 2 captures emitted light with a camera to specify a direction. The display apparatus 2 determines a position of the pen based on the direction and the distance. The projector draws (projects) a trajectory of the pen as stroke data. In this case, an external image is input to the projector, and the stroke data is superimposed on the external image.

In addition, the functional configuration as illustrated in FIG. 6 is divided into the blocks based on main functions of the display apparatus 2, in order to facilitate understanding the processes performed by the display apparatus 2. No limitation to a scope of the present disclosure is intended by how the processes are divided or by the name of the processes. The processing implemented by the display apparatus 2 may be divided into a larger number of processing units depending on the content of the processing. Also, one processing unit can be divided so as to include more processing units.

A part of the processing performed by the display apparatus 2 may be performed by a server connected to the display apparatus 2 via a network.

In a related art, hand drafted data is not used for searching for information. With a display apparatus, characters can be input by hand drafted input using an electronic pen or a finger, for example. If a search is performed using such hand drafted data, it is expected that a more detailed search can be performed.

According to an embodiment of the present disclosure, a display apparatus that searches for information using hand drafted data can be provided.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The functionality of the elements disclosed herein may be implemented using circuitry or processing circuitry which includes general purpose processors, special purpose processors, integrated circuits, application specific integrated circuits (ASICs), digital signal processors (DSPs), field programmable gate arrays (FPGAs), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The present disclosure can be implemented in any convenient form, for example using dedicated hardware, or a mixture of dedicated hardware and software. The present disclosure may be implemented as computer software implemented by one or more networked processing apparatuses. The network can include any conventional terrestrial or wireless communications network, such as the Internet. The processing apparatuses can include any suitably programmed apparatus such as a general purpose computer, personal digital assistant, mobile telephone (such as a wireless application protocol (WAP) or 3G-compliant phone), for example. Since the present disclosure can be implemented as software, each or every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a CPU, an RAM, and a hard disk drive (HDD). The CPU may be implemented by any desired kind of any desired number of processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The invention claimed is:

1. A display apparatus, comprising circuitry configured to:
receive an input of hand drafted data;
display, on a display, an object corresponding to the hand drafted data and an external image that is externally input;
perform character recognition on the hand drafted data to convert the hand drafted data into text data; and display, on the display, a search result obtained using at least a part of the external image and at least a part of the text data, wherein, in case that an area is specified in the external image according to another input of different hand drafted data and the hand drafted data is associated with the area, the circuitry performs a search using an image within the area and the at least the part of the text data, and wherein in case that the area is specified with a frame made according to the another input of the different hand drafted input and the input of the hand drafted data is performed within the frame, the circuitry performs the search using the image within the frame and the at least the part of the text data.

2. The display apparatus of claim 1, wherein the circuitry
converts the text data into search intent, and
searches for a web site with respect to the image within the frame, based on the search intent.

3. The display apparatus of claim 2, wherein the circuitry
refers to intention conversion information that is information in which the text data, the search intent, and information to be used for the search are associated with each other, the information to be used for the search being at least one of the image within the frame or a feature of the image within the frame, and
searches for the web site based on the intention conversion information.

4. The display apparatus of claim 3, wherein
in case that the information to be used for the search associated with the text data is the image within the frame, the circuitry searches for the web site having another image similar to the image within the frame.

5. The display apparatus of claim 3, wherein
in case that the information to be used for the search associated with the text data is the feature of the image within the frame, the circuitry searches for the web site having the image within the frame and another image similar to the image within the frame.

6. The display apparatus of claim 4, wherein
in case that the search intent associated with the text data is a copyright of the web site having the image within the frame, the circuitry searches for the web site having the another image similar to the image within the frame, and obtains the copyright of the web site.

7. The display apparatus of claim 4, wherein
in case that the search intent associated with the text data is the another image similar to the image within the frame present in the web site having the image within the frame, the circuitry searches for the web site having the image within the frame and the another image similar to the image within the frame, and obtains the another image similar to the image within the frame from the web site.

8. A display method, comprising:
receiving an input of hand drafted input data;
displaying, on a display, an external image externally input and an object corresponding to the hand drafted input data;
performing character recognition on the hand drafted data to convert the hand drafted data into text data; and
displaying, on the display, a search result obtained using at least a part of the external image and at least a part of the text data,
wherein, in case that an area is specified in the external image according to another input of different hand drafted data and the hand drafted data is associated with the area, the circuitry performs a search using an image within the area and the at least the part of the text data, and
wherein in case that the area is specified with a frame made according to the another input of the different hand drafted input and the input of the hand drafted data is performed within the frame, the circuitry performs the search using the image within the frame and the at least the part of the text data.

9. A display system, comprising:
an information processing apparatus including information processing apparatus circuitry; and
a display apparatus including display apparatus circuitry,
the information processing apparatus circuitry being configured to
receive hand drafted data and an external image from the display apparatus, the external image externally input to the display apparatus,
perform character recognition on the hand drafted data to convert the hand drafted data into text data, and
transmit to the display apparatus a search result obtained using at least a part of the external image and at least a part of the text data,
the display apparatus circuitry being configured to
receive the hand drafted data via a display,
display, on the display, an object corresponding to the hand drafted data and the external image, and
display, on the display, the search result transmitted from the information processing apparatus,
wherein, in case that an area is specified in the external image according to another input of different hand drafted data and the hand drafted data is associated with the area, the circuitry performs a search using an image within the area and the at least the part of the text data, and
wherein in case that the area is specified with a frame made according to the another input of the different hand drafted input and the input of the hand drafted data is performed within the frame, the circuitry performs the search using the image within the frame and the at least the part of the text data.

\* \* \* \* \*